UNITED STATES PATENT OFFICE 3,829,468
Patented Aug. 13, 1974

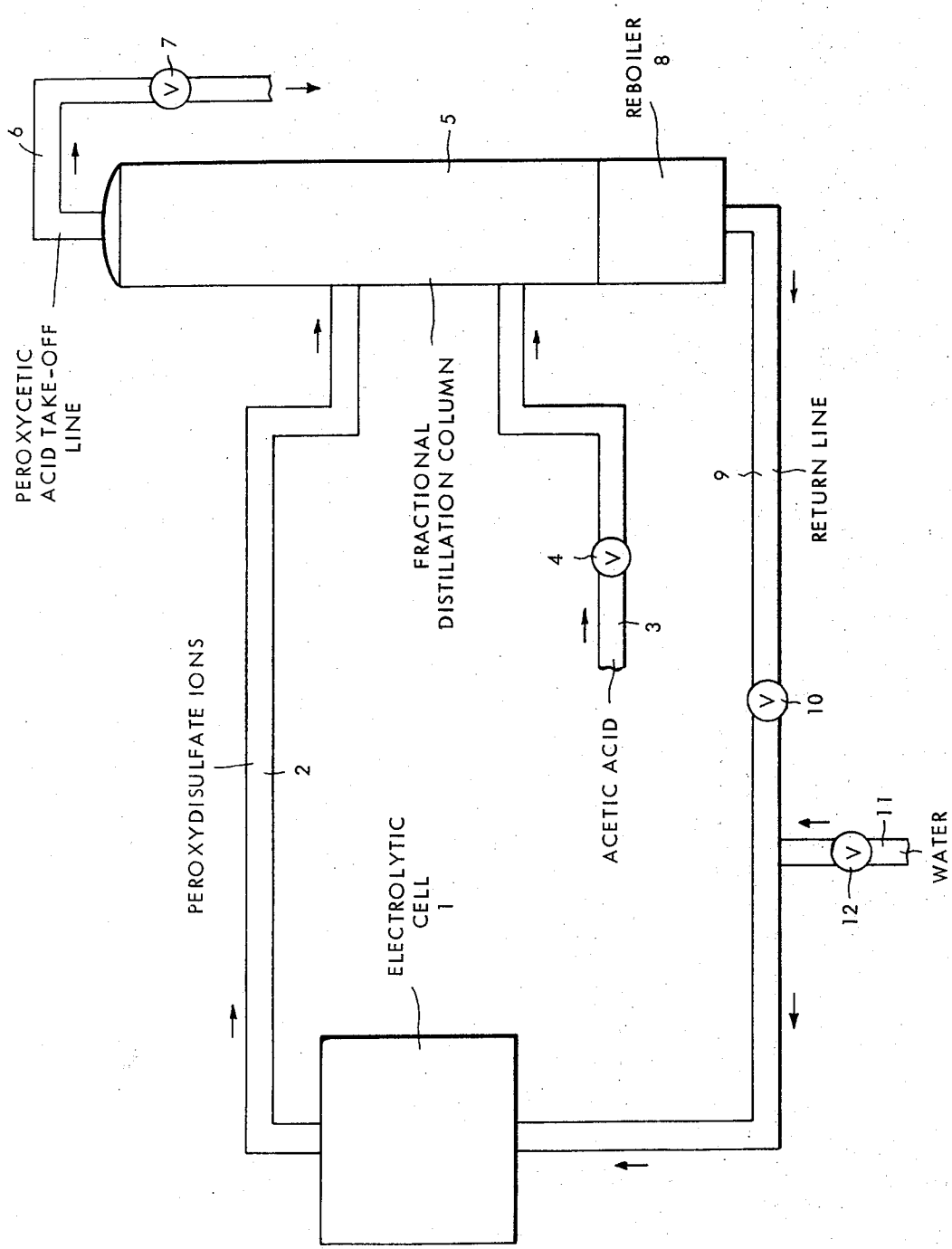

3,829,468
PROCESS FOR THE PRODUCTION OF PEROXYACETIC ACID
George A. Serad, Charlotte, N.C., and Alexander F. MacLean, Durham, N.H., assignors to Celanese Corporation, New York, N.Y.
Continuation-in-part of abandoned application Ser. No. 48,962, June 23, 1970. This application June 21, 1972, Ser. No. 265,032
Int. Cl. C07b 3/00; C07c 73/10
U.S. Cl. 260—502 R                 8 Claims

ABSTRACT OF THE DISCLOSURE

Peroxyacetic acid is produced by a process wherein aqueous peroxydisulfate ions are generated in an electrolytic cell and reacted with acetic acid to form an aqueous solution of peroxyacetic acid and a peroxydisulfate reduction product. The peroxyacetic acid is separated from the peroxydisulfate reduction product and the latter can be recycled to the electrolytic cell for use in generating new peroxydisulfate ions.

---

This application is a continuation-in-part of copending application Ser. No. 48,962, filed June 23, 1970, now abandoned.

BACKGROUND OF THE INVENTION

This invention relates to the production of peroxyacetic acid by oxidation of acetic acid. More particularly, the invention pertains to the use of peroxydisulfate ions as the oxidizing agent and to a continuous process for the preparation of peroxydisulfate ions and peroxyacetic acid.

There are two principal methods heretofore known for the commercial production of peroxyacetic acid. In the first of these, hydrogen peroxide and sulfuric acid are reacted with acetic acid. Unfortunately, this method has several disadvantages. In particular, it requires the use of very concentrated solutions of hydrogen peroxide (e.g., 90 percent) which are expensive to ship and dangerous to handle. The second principle method for the preparation of peroxyacetic acid involves the vapor phase oxidation of acetaldehyde. This method requires large amounts of reactants and is not adapted to the production of relatively small amounts of peroxyacetic acid.

Therefore, it is an object of the present invention to provide an improved process for the production of peroxyacetic acid.

Another object is to provide an improved process for the production of peroxyacetic acid which involves relatively low shipment costs and reactants which are safe to handle.

Yet another object is to provide an improved process for production of peroxyacetic acid which is not limited to the production of relatively large quantities of peroxyacetic acid.

These and other objects of the invention as well as the advantages thereof can be had by reference to the following detailed description and claims.

SUMMARY OF THE INVENTION

An economical, self-contained method of producing peroxyacetic acid has been discovered which overcomes many of the above-mentioned problems previously associated with its preparation. The method of this invention involves the electrolytic formation of peroxydisulfate ions by the anodic oxidation of sulfate ions in aqueous medium. The peroxydisulfate ions are then reacted directly with acetic acid to form a peroxyacetic acid product which can be isolated by conventional methods. A by-product of this reaction is a peroxydisulfate reduction product which is returned to the electrolytic cell for re-oxidation and subsequent re-use. In a preferred mode of this invention (described hereinbelow) the peroxyacetic acid product is isolated in the form of an aqueous solution by fractional distillation. The term "peroxydisulfate reduction product" as used herein is meant to include those products resulting from the reduction-hydrolysis of peroxydisulfuric acid and peroxydisulfate ions. Thus, when peroxydisulfate ions react with acetic acid in the presence of water they are reduced to sulfate ions:

(1) $CH_3COOH + S_2O_8^= + H_2O \rightleftharpoons CH_3COOH$ 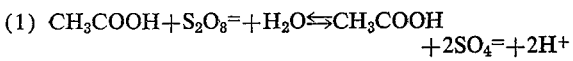
$+ 2SO_4^= + 2H^+$ As this reaction proceeds, the peroxy-acetic acid is continuously removed and equilibrium is shifted to the right. Likewise, peroxydisulfate ($S_2O_8^=$) can be hydrolyzed to peroxymonosulfate ($SO_5^=$) which can be further hydrolyzed to sulfate ions ($SO_4^=$).

(2) $S_2O_8^= + H_2O \rightleftharpoons SO_5^= + SO_4^= + 2H^+$
(3) $SO_5^= + H_2O \rightleftharpoons SO_4^= + H_2O_2$
(4) $SO_5^= + H_2O_2 \rightleftharpoons SO_4^= + O_2 + H_2O$ Thus, the term "peroxydisulfate reduction product" includes the above products, among others.

By utilizing the process of this invention, the costly and dangerous use of hydrogen peroxide is eliminated. Furthermore, the high ransportation costs of raw materials are substantially reduced or eliminated, since the only materials continuously consumed in the process of this invention are electricity, water, and acetic acid. Moreover, the acetic acid recovered as a by-product from the use of peroxyacetic acid can be recycled and reoxidized, substantially reducing the need for a further reactant supply. Thus, the process of this invention, in cases where acetic acid can be reclaimed, ideally only requires start-up materials to charge the processing unit.

The peroxydisulfate ions suitable for use in the present process can be prepared by various methods including chemical oxidation of sulfuric acid. However, it is a feature of the present invention that the peroxydisulfate ions are prepared electrolytically.

The electrolytic cell useful in carrying out the preferred peroxydisulfate ion preparation process of this invention can be of conventional design, i.e., equipped with an anode and a cathode. However, due to the strongly oxidative nature of the products produced by the electrolysis herein, certain modifications are desirable. Thus, the cathode is advantageously constructed of carbon of graphite-containing materials. Furthermore, the anode should be of a material which is not substantially oxidizable. Examples of useful anode materials include platinum, lead oxide, nickel, nickel oxide, lead oxide coated carbon, gold, and the like. Preferably, the anode is formed of platinum.

The preferred electrolytic cell configuration comprises an internal anode surrounded by a membrane which in turn is further surrounded by the cathode. This membrane can be formed of any of the common membrane materials such as those used in chlorine cells. Included are asbestos, porcelain, ceramics and ion-permeable membranes. In a variation of this configuration, a multi-chambered cell having alternating cathode and anode members separated by the above-described membrane can be used. This membrane is useful for inhibiting the undesirable electrolytic reduction of the peroxydisulfate ions. Thus, if peroxydisulfate ions are allowed to come into contact with the cathode, they would be immediately reduced back to the sulfate ion starting material.

The electrolytic cell as described above is filled with an aqueous sulfate ion-containing solution. The concentration of this solution can range from about 1 molar to about 8–10 molar, preferably about 2–5 molar. Any suitable source of sulfate ions can be used in this invention. However, it is preferred that the sulfate ion source be selected from sulfuric acid, water soluble metal sulfates, and water soluble quaternary amine sulfates and the like, or mixtures thereof. Most preferred is a mixture of a sulfate salt such as ammonium sulfate and sulfuric acid, these two constituents being present at the 0.25–3 molar level and 1–5 molar level, respectively.

Any convenient source of direct electrical current can be used in the process of the present invention. However, a control means such as a rheostat should be attached to this source in order to regulate the voltage applied to the cell itself. The applied voltage should be in the range of about 2.5 to about 10 volts. If less than about 2.5 volts are applied, no appreciable formation of peroxydisulfate ions is possible. On the other hand, when the voltage is increased above the 10 volt level the current density (defined as the current per unit area available at the anode) increases to such an extent that the cell begins to overheat thereby causing decomposition of the peroxydisulfate ions. Preferably, the electrolytic cell of this invention should be operated in the range of about 3–5 volts so that a current density at the anode of about 0.1 to 5 amps/cm.$^2$ results. The maximum current efficiency (defined as the amount of current which actually acts to produce peroxydisulfate ions) is attained with a current density of about 1 to 3 amps/cm.$^2$.

Normally, it is desirable that the temperature of the cell described herein be maintained at the lowest possible level in order to obtain maximum current efficiency. However, when acetic acid is present in the electrolytic cell, as is the case whenever a continuous process is employed, there is generally no significant relationship between current efficiency and temperature, especially when ambient or lower temperatures are employed. However, in order to minimize the amount of heat degradation of the peroxydisulfate ions, it is preferable to maintain the electrolytic cell at a temperature of between about 20° C. and about 50° C.

When a continuous process is used according to the process of the present invention, unreacted acetic acid is charged to the electrolytic cell along with the peroxydisulfate reduction product (as defined above). The presence of this acetic acid has a substantial effect on current efficiency, and its concentration in the cell must therefore be controlled. Acceptable current efficiencies (i.e., about 35%) are obtained when the concentration of acetic acid charged to the cell is maintained at less than about 3 molar, and preferably less than about 2 molar. Acetic acid concentration in the cell can be controlled by controlling (1) the amount of acetic acid introduced into the fractional distillation column, and (2) the efficiency and amount of reaction between peroxydisulfate ions and acetic acid to form peroxyacetic acid. Control of these factors is discussed below.

In order to monitor the voltage and current at the anode described above, a reference cell is used. This cell is connected to the anode by means of a salt bridge opening at one end in the immediate vicinity of the anode and connected at the other end to a conventional voltage measuring means. This bridge can contain any electrolyte, including that which is present in the electrolytic cell (i.e. a "cellularelectrolyte"). However, when "non-cellular" electrolytes are used, the end of the salt bridge opening into the cell anode area must be sealed with a semi-permeable membrane so that none of the bridge electrolyte is allowed to co-mingle with the cell electrolyte.

The aqueous solution of peroxydisulfate ions prepared in the electrolytic cell is pumped to a reactor where acetic acid and water, if desired, are added. After the reaction is completed, a solution of peroxyacetic acid is separated from the resulting peroxydisulfate reduction product. This separation can be carried out by any conventional method, including extraction, evaporation, or preferably distillation. Acetic acid can be obtained as a raw material or it can be obtained from operations where it is formed as a by-product from the reduction of peroxyacetic acid. According to a preferred mode of this invention a fractional distillation column is used as both the reactor and as the means for separating the peroxyacetic acid product. In this process, it is preferred that the aqueous peroxydisulfate ion solution and the acetic acid enter the fractional distillation column near its middle. At this point they are mixed and begin to react as follows:

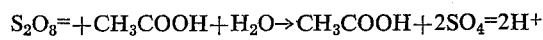

$$S_2O_8^= + CH_3COOH + H_2O \rightarrow CH_3COOH + 2SO_4^= 2H^+$$

The column itself can be of any standard design; however, for best results it should have about 10–50 theoretical plates (preferably about 15–30) and a variable reflux ratio set at about 1/1 to 20/1 (preferably about 8/1–15/1). In addition, the distillation column should be equipped with a heated reboiler designed so that the liquid residence time in both the column and the reboiler is in the range of about 10 minutes to about 1 hour, preferably about 20 to 40 minutes.

As the reaction of the peroxydisulfate ions and the acetic acid proceeds, peroxyacetic acid is distilled and removed from the top of the column in the form of its aqueous solution. Since water forms an azeotrope with peroxyacetic acid but not with acetic acid, the unreacted acetic acid is separated from the peroxyacetic acid-water azeotrope and remains in the reaction column.

In order to provide maximum reaction efficiency in the column, the temperature at the take-off point at the top of the column should be maintained at about 110° C.–120° C. preferably 110° C. to 115° C. This temperature can be controlled by varying the heat input to the reboiler located at the bottom of the column. In a preferred arrangement, a temperature sensor is imbedded in the column near the top take-off point. The sensor is adjusted to control the temperature at this point at two or three degrees above the desired take-off temperature. When the temperature at the sensor point increases above the desired temperature the sensor can then act either to increase the reflux ratio of column or decrease the heat input on the reboiler. Likewise, when the temperature at the sensor point decreases below the desired level either the reflux ratio can be decreased or the reboiler temperature input increased.

While the peroxyacetic acid is being removed azeotropically, the unreacted acetic acid and the peroxydisulfate reduction products fall into the reboiler where they can be continuously removed and returned to the electrolytic cell along with any additional amounts of water lost due to the azeotropic distillation of the aqueous peroxyacetic acid solution. Thus, a continuous cycle resulting in the production of an aqueous solution of peroxyacetic acid can be formed, if desired. The use of this continuous cycle is the preferred process of this invention. However, the process of this invention need not be carried out as a continuous one. For example, especially where highly efficient production of peroxyacetic acid is required, the peroxydisulfate reduction products can be discarded or otherwise disposed of rather than returned to the electrolytic cell.

As can readily be seen several factors must be controlled in order to obtain maximum column and reaction efficiency. The most obvious factor influencing reaction efficiency is the temperature at which the reaction is carried out. But this temperature is limited due to the distillation separation methods employed herein. As previously stated, this temperature should be maintained in the 110° C.–120° C. range. Residence time in the column and reboiler is likewise a factor in determining the efficiency of the reaction. Again, this time factor should be in the range of about ten minutes to one hour. One of the most important factors affecting column efficiency is the concentration and ratio of the reactants. Generally, the peroxydisulfate reaction mixture obtained from the electrolytic cell should be at least 0.1 to 0.5 molar in peroxydisulfate ions. These ions can be present at a level as high as about 4.0 to 6.0 molar. Moreover, the acetic acid concentration that is added to the column should be at about the 2.0 to 6.0 molar concentration. When the process of this invention is in continuous operation a certain amount of acetic acid will be present in the electrolytic cell due to its incomplete utilization in the distillation column and reboiler. Therefore, a portion of the peroxydisulfate solution will contain a concentration of acetic acid. In order to maintain a continuous cyclic reaction the amount of acetic acid normally added should be reduced by the amount present in the peroxydisulfate solution. A final factor influencing reaction efficiency is the use when desired, of an appropriate reaction catalyst. Preferred are the lower aliphatic sulfonic acids such as methane or ethane sulfonic acid. This catalyst should, when present, be added at about 0.25 to 2 molar level, preferably about the 0.5 to 1.5 molar level.

By utilizing the above procedures and equipment, peroxydisulfuric acid or peroxydisulfate ions can be generated at about 50% current efficiency level and reacted with acetic acid to produce about a 0.15 to 6.0 molar aqueous solution of peroxyacetic acid with a peroxydisulfate reaction efficiency of about 10% to 35%, peroxydisulfate efficiency being defined as the number of moles of peroxyacetic acid produced per mole of peroxydisulfate ion.

DESCRIPTION OF THE DRAWING

The drawing depicts a schematic flow diagram corresponding to the preferred process of this invention. In it, the peroxydisulfate ions are generated in the electrolytic cell (1). These ions are then pumped down a column feed line (2) to the fractional distillate column (5). Concurrently with this feed, acetic acid is pumped through a feed line (3) and a valve (4) into the column (5). As the peroxyacetic acid is formed it is withdrawn through a take-off line (6), and a take-off valve (7). Unreacted acetic acid and the peroxydisulfate reduction products fall into reboiler (8) and after further reaction are withdrawn through a return line (9) and a return valve (10). Additional water and peroxydisulfate ion to replace that lost by the oxidation reaction and fractional distillation, is added to the returning products through line (11), and and valve (12). Finally, all the returning products are pumped into the cell (1) for reoxidation.

The peroxyacetic acid solution prepared herein is a readily reactive oxidizing agent. It is useful in the preparation of epoxide-containing materials as well as in the bleaching of textiles and wood pulp.

EXAMPLES

In the following examples, parts and percentages are by weight unless otherwise specified.

Example 1

An electrolytic cell was prepared using a 0.020 inch platinum wire coil having a 0.4 cm.$^2$ surface area as the anode. Surrounding this anode was placed a carbon 320 (Speer Carbon Co.) graphite cathode having a surface area of 6.7 cm.$^2$. Into this cell immediately outside the cathode was placed a three-turn, 3½ inch, glass cold water cooling coil. Separating the anode from the cathode was a porcelain semipermeable membrane. Power was supplied from a Kepco PBX–7–2C 2-ampere power supply. This cell was filled with an aqueous solution which was four molar in sulfuric acid, one molar in ammonium sulfate and one molar in methane sulfonic acid. Two inch in diameter Oldershaw columns were attached together to provide a total of about 20 trays and further attached to a reboiler. From a point about 15 trays above the reboiler the column was connected to the above cell through an electrolytic reservoir. An acetic acid intake valve was provided at this same point. Finally, the reboiler was connected to the above cell through a cell return pump and a water intake valve.

The electrolytic cell was activated and supplied with a current density of one amp/cm.$^2$ at the anode and a voltage of about 4.5 volts. By regulating the flow of cold water through the cell cooling coil, the temperature of the cell electrolyte was maintained at a constant 25° C. As the peroxydisulfate ions were prepared in this cell they were pumped into the column at a 0.2 molar concentration and a flow rate of 6 cc./minute. At the same time, acetic acid was introduced into the column and maintained at a constant two molar level. The column was heated by applying steam to the reboiler so that a temperature of 112° C. to 113° C. was maintained at the top-most portion of the column. Reflux ratio was adjusted to 10/1, producing thereby a column residence time of about 20 minutes. Unreacted acetic acid and peroxydisulfate reduction products are returned to the electrolytic cell and mixed with additional water to replace the water removed at the top of the distillation column. Using this continuous process, a 30 percent efficiency of peroxydisulfate conversion of acetic acid to peroxyacetic acid is obtained producing a 0.43 molar (3.2 percent) aqueous solution of peroxyacetic acid at a rate of about one cc./minute.

Example 2

A continuous peroxyacetic acid generator was assembled similar to that of Example 1 except that no methanesulfonic acid was employed. Peroxyacetic acid was formed as a 0.22 molar aqueous solution (15 percent efficiency) at a rate of about one cc./minute.

While the instant invention has been described in terms of the examples and description given above, it is to be understood that it is intended to cover all changes and modifications which do not constitute departures from the spirit and scope of the invention.

What we claim is:

1. A process for the production of peroxyacetic acid comprising reacting acetic acid with a source of peroxydisulfate ions in an aqueous medium at reflux, the concentration of peroxydisulfate ions being at least 0.1 molar up to 6.0 molar and the concentration of acetic acid being about 2.0 to 6.0 molar; and separating the peroxyacetic acid.

2. The process of claim 1 wherein the peroxyacetic acid is separated from the reactants by fractional distillation at a temperature of about 110–115° C.

3. The process of claim 1, wherein the reaction is catalyzed by a lower aliphatic sulfonic acid.

4. The process of claim 1, wherein the peroxydisulfate ions are generated in an aqueous electrolytic cell comprising sulfate ions in a concentration from about 1 to about 10 molar with an applied voltage of about 2.5 to about 10 volts and a temperature not above about 50° C.

5. A process for the continuous preparation of peroxyacetic acid comprising (a) generating peroxydisulfate ions in an electrolytic cell comprising an aqueous medium with a sulfate ion concentration from about 1 to about 10 molar, and an applied voltage of about 2.5 to about 10 volts, said cell being maintained at a temperature not above about 50° C.;

(b) introducing the said peroxydisulfate ions to an aqueous reaction zone comprising acetic acid in a concentration of 2.0 to 6.0 molar to provide a peroxydisulfate ion concentration of at least 0.1 molar up to 6.0 molar and effecting the reaction of said ions with acetic acid at reflux to form peroxyacetic acid and a peroxydisulfate reduction product;

(c) separating said peroxyacetic acid; and (d) returning a peroxydisulfate reduction product stream to said cell, the proportion of acetic acid in such stream being maintained below 3 molar.

6. The process of claim 5 wherein said reaction and separating of peroxyacetic acid takes place in a fractional distillation system wherein the product stream is removed as an aqueous azeotrope at about 110–115° C.

7. The process of claim 5, wherein the source of sulfate ions in a mixture of ammonium sulfate and sulfuric acid, the ammonium sulfate being present at the 0.25 to 3 molar level and the sulfuric acid being present at the 1 to 5 molar level.

8. The process of claim 5 wherein the applied voltage is 3 to 5 volts and the current density at the anode is about 0.1 to 5 amps/cm.$^2$.

References Cited

FOREIGN PATENTS 2,018,216  11/1971  Germany _____ 204—79

HOWARD S. WILLIAMS, Primary Examiner

R. L. ANDREWS, Assistant Examiner

U.S. Cl. X.R.

204—79